SELECTIVE FREQUENCY GATE AND SIGNALLING CIRCUIT

Filed Nov. 22, 1963

INVENTOR.
Leonard Emfred Hedlund
BY
Byron, Hume, Groen & Clement
attys 3,332,021
Patented July 18, 1967

3,332,021
SELECTIVE FREQUENCY GATE AND SIGNALLING CIRCUIT

Leonard Emfred Hedlund, Omaha, Nebr., assignor to McMartin Industries, Inc., Omaha, Nebr., a corporation of Nebraska Filed Nov. 22, 1963, Ser. No. 325,708
4 Claims. (Cl. 325—392)

Figure 1:
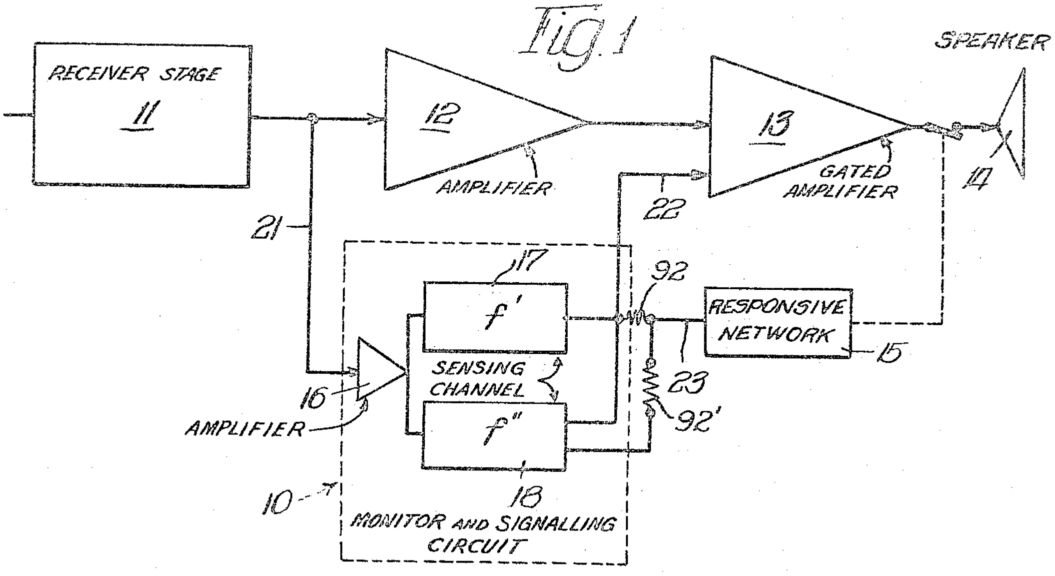

This invention relates to the reception and reproduction of a transmitted frequency spectrum (e.g. audio information) and more particularly to a selective frequency gate and signalling circuit that can be employed in conjunction with any of a variety of receiving networks.

Present day technological advances in such areas as radio broadcasting, voice communication, etc. have led to the development of a variety of refined networks for effecting the transmission and reception of audio information. Similarly, a variety of other networks have been and are currently being developed for effecting the reception and reproduction of other frequency spectra (e.g. video information). Notwithstanding the specific nature of the receiving equipment utilized in such networks, the information, whether it be an audio, video, or other frequency spectrum, is reproduced and, as such, is present at an output stage of the receiver so that it can be amplified and rendered suitable for reproduction.

In typical but diverse areas of audio reception such as FM-stereo multiplexing, telephone communications and the like it is highly desirable to provide a suitable means that can be associated with the receiving equipment so that the receiver can be rendered effective in ineffective in response to preselected signals. A typical example of this is the concept of selective muting of FM multiplexing equipment, which is treated in some detail in an article entitled "More Multiplex Profits from Selective Muting" that appeared in the November 1960 issue of Broadcast Engineering.

It has been realized that the basic concept underlying selective muting can be extended to and employed in countless of other receiving networks for audio, video and other reproducible frequency spectra so that almost any type of receiver can be selectively turned on, turned off and/or otherwise intermittently operated in response to pre-established signals that are transmitted with and as a part of the frequency spectrum that is to be reproduced.

Accordingly, it is the prime object of the present invention to provide an auxiliary circuit for use in conjunction with any of the variety of receiving networks, which circuit allows the receiver operation to be selectively controlled in response to signals that are transmitted with and as a part of a frequency spectrum that is to be reproduced.

Still another object of the present invention is to provide an auxiliary circuit for receiving networks that functions as a selective frequency gate and signalling circuit so that the desired intermittent operation of a receiver employing same can be realized for either transient or prolonged intervals.

An additional object of the present invention is to provide a selective frequency gate and signalling circuit which fulfills the objects outlined above, is relatively low-cost and simple in construction, can be readily adapted for use with any of the variety of receiving networks, and has extremely high sensitivity to control signals that are transmitted with and as a part of the frequency spectrum to be reproduced.

Figure 2:
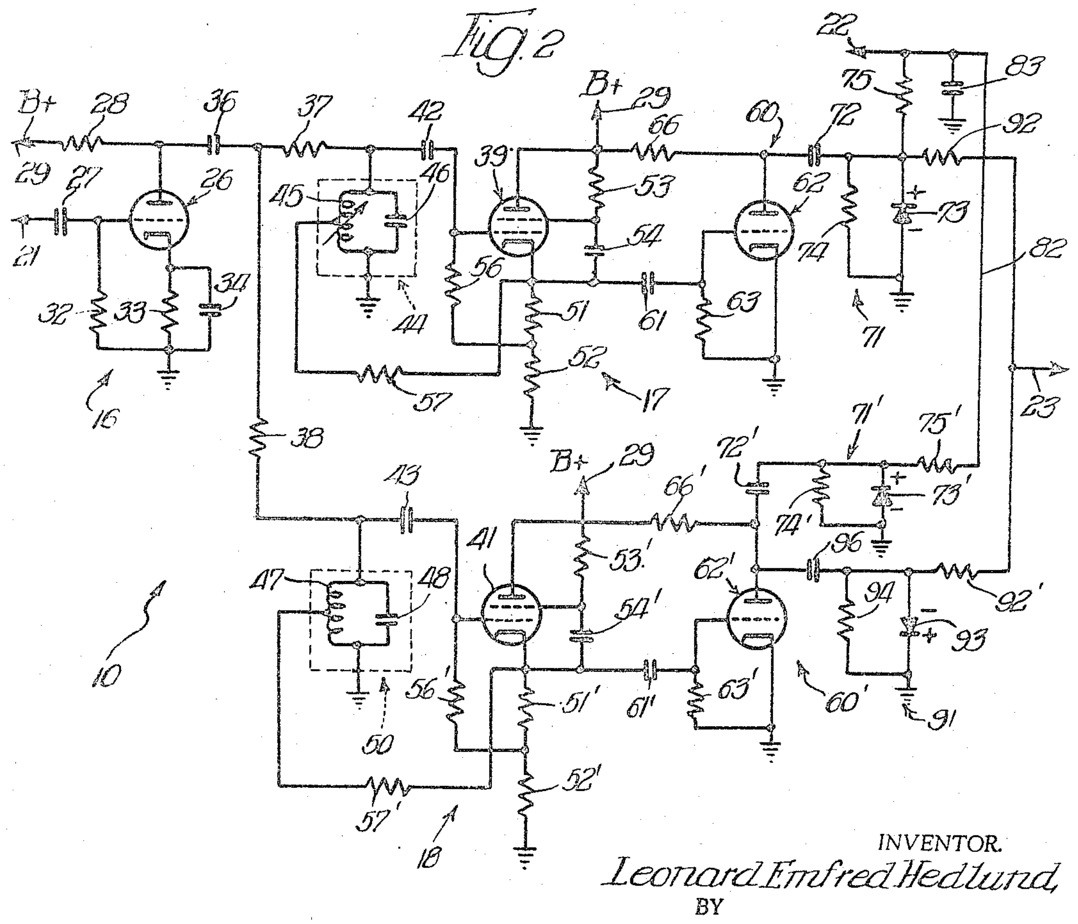

Other objects and advantages of the present invention will become apparent from the following detailed description of one pereferred embodiment thereof when considered in conjunction with the accompanying drawing wherein:

FIGURE 1 is a block diagram of a selective frequency gate and signalling circuit when employed in conjunction with a portion of a typical receiving network; and FIGURE 2 is a detailed schematic of one preferred embodiment of the selective frequency gate and signalling circuit depicted in FIGURE 1.

In general, the present invention is directed to a circuit that can be employed in conjunction with any of a variety of receivers that effect the reproduction of a transmitted frequency spectrum notwithstanding the nature of the specific transmission mode. The circuit is designed to reliably control the operation of a receiver so that the reproduction of information effected thereby can be intermittently and selectively interrupted.

Referring to FIG. 1, the circuit of the present invention, which is generally designated by the numeral 10, is illustrated as being employed in conjunction with a portion of a typical receiver that effects the reproduction of a transmitted frequency spectrum (e.g. an audio frequency spectrum). The input to the circuit 10 is shown as being connected between the output of one receiver stage 11 and the input to the following receiver stage 12. In one type of receiver with which the circuit 10 can be employed, the stage 11 might be a detector stage of a superheterodyne receiver and the stage 12 an audio amplifier that supplies the reproduced audio information through a gated amplifier 13 and to a typical speaker 14 or the like.

The circuit 10 functions to monitor the output from the stage 11 and, in response to pre-established signal pulses that are transmitted with and as a part of the audio information, produces control signals that lead to the selective intermittent interruption of the output from the receiver. In this connection, when the circuit 10 senses such pre-established signal pulses, the circuit 10 responds so that the operation of the gated amplifier 13 is transiently placed under the control thereof and an output signal is concomitantly fed to an external responsive network (or several networks) 15.

More particularly, the illustrated circuit 10 includes an input amplifier 16 and at least a pair of sensing channels 17 and 18 (only one or several additional such channels might be employed in specific applications). The channels 17 and 18 are each tuned to respond to a particular frequency and, in so responding, each produces an output signal that is fed to the gated amplifier 13 and to the responsive network 15. In this connection, the channel 17 is preferably responsive to a first frequency, which for purposes of this description shall be designated $f'$, and the channel 18 is preferably tuned to a second frequency, which is hereinafter designated $f''$.

In operation, when a signalling pulse having a frequency $f'$ is fed to the circuit 10, the channel 17 is rendered effective to produce an output signal that is fed to and transiently blocks the output from the gated amplifier 13. At the same time, the output from the channel 17 is fed to the responsive network 15.

In one typical application of the circuit 10, the responsive network 15 functions to isolate the speaker 14 from the gated amplifier, when supplied with an output signal from the channel 17. Accordingly, in this instance, the output from the gated amplifier is interrupted for a prolonged period rather than merely transiently. Thereafter, when a signal pulse having a frequency $f''$ is fed to the circuit 10, the channel 18 is rendered effective and an output signal therefrom is fed both to the gated amplifier 13 and the responsive network 15. The output from the channel 18 is preferably utilized to re-establish the connection between the gated amplifier and speaker so that the normal operation of the receiver resumes.

This example of the operation of the circuit 10 is set forth merely to illustrate the general operation of the circuit and is not intended to limit its use. However, it will be appreciated from this example that the output from the gated amplifier 13 is cut off each time a signal pulse is produced by either the channel 17 or 18. Therefore, notwithstanding the performance of an additional external function in response to output signals from the channels 17 and 18, the signal pulses, which can be a source of irritation and otherwise undesirable, are not transmitted to the speaker. In this connection, the relative response times of the circuit 10 and the portion of the receiver that is connected in parallel therewith are such that the amplifier is positively cut-off before the control signals can be detected at the output of the receiver.

As previously described, the present invention can be employed in conjunction with any of the variety of receiving networks that effect the reception and reproduction of a transmitted frequency spectrum. However, consistent with the foregoing general description and in order to provide a clear and detailed description of the circuit of the present invention, it will be assumed that the circuit 10 is employed to effect the selective muting of an audio receiver in response to signal pulses that are transmitted with and as a part of the audio information. In this connection and for purposes of this description only, it is further assumed that the circuit 10 functions to block the output from the speaker 14 for a prolonged period (e.g. corresponding to the duration of a commercial message that interrupts an otherwise continuous period of music presentation). The use of the circuit 10 for this purpose has utility in stores, offices and the like that employ a scheme of background music.

Although the following detailed description of the circuit 10 is related to its operation in response to the audio frequency spectrum, it should be understood that this circuit is adaptable to any of a variety of receivers and is operable in any or all frequency spectra. In addition, although the circuit as hereinafter described employs vacuum tube circuitry, the circuit could readily be fully transistorized and employ suitable semiconductor devices in specific applications.

Referring in detail to the nature and function of the circuit 10, a conductor 21 connects the output of the stage 11 to the input of this circuit, a conductor 22 connects the output thereof to the gated amplifier 13, and a conductor 23 connects the circuit to the responsive network 15. More particularly, the conductor 21 supplies the audio output from the stage 11 to the wide band amplifier 16 through a coupling capacitor 27. As shown, the wide band amplifier 16 includes a triode vacuum tube 26 that has the plate thereof connected through a plate load resistor 28 to a source of positive potential 29 (i.e. B+). The coupling capacitor 27 is connected to the grid of the triode 26 and, in a conventional manner, a grid load resistor 32 is connected between the grid and ground. A parallelly connected biasing resistor 33 and bypass capacitor 34 connect the cathode of the triode 26 to ground.

By employing the wide band amplifier 16 at the input to the circuit 10, the entire audio spectrum that is produced at the output of the stage 11 is amplified and supplied to the channels 17 and 18 (i.e. in addition to being fed through the amplifier 12 to the gated amplifier 13). As shown, a capacitor 36 couples the output of the amplifier 16 to the channel 17 through a relatively high impedance isolation resistor 37 and to the channel 18 through a similar isolation resistor 38.

The isolation resistors 37 and 38 are connected to the grids of vacuum tube tetrodes 39 and 41 through coupling capacitors 42 and 43, respectively. The junction of the isolation resistor 37 with the coupling capacitor 42 at the input to the channel 17 is connected to ground through a parallel L-C filter network 44. The network 44 includes a coil 45 and a capacitor 46 that are connected in circuit with a cathode follower including the tetrode 39 so that this network which is tuned to a frequency $f'$, functions as a Q multiplier. A similar network 50, which also functions as a Q multiplier at the input to the channel 18 but which is tuned to a frequency $f''$, includes a coil 47 and a capacitor 48 that are connected in circuit with a cathode follower formed by the tetrode 41. The extremely high Q characteristics of the networks 44 and 50 (i.e. see, for example, the article by H. E. Harris entilted, "Simplified Q Multiplier"—Electronics May 1951) result in substantially only those signal components having a frequency $f'$ or $f''$ being passed by the channels 17 and 18, respectively.

In this connection, when a signal component having a frequency $f'$ is developed at the output of the stage 11, the filter network 44 offers an extremely high impedance thereto and the resulting voltage that is developed across this network is fed through the coupling capacitor 42 to the grid of the tetrode 39. As shown, the plate of this tube is connected to the source of positive potential 29 (i.e. B+), and the cathode thereof is connected to ground through a biasing resistor 51 and a load resistor 52. A dropping resistor 53 is connected between the plate and screen grid of the tetrode 39 and a bypass capacitor 54 connects the screen to the cathode. A grid load resistor 56 is connected between the grid of this tube and the junction between the biasing and load resistors 51 and 52. Finally, a feedback resistor 57 is connected between the cathode of the tetrode 39 and a tap on the coil 45.

As discussed in the aforementioned article, the feedback resistor 57 provides positive feedback for the network 44 and compensates for the resistance of the coil 45. Since this enhances the "Q" characteristic of the filter network, the input to the channel 17 (and, similarly, the input to the channel 18) is characterized by an extremely high selectivity. The highly selective response (i.e. the high "Q") of the filter network 44 to only those components having a frequency $f'$ is further enhanced by the high impedance characteristics of the isolation resistor 37 and the high input impedance of the cathode follower circuit including the tetrode 39 that precludes loading of the filter network.

The characteristics and functions of the filter network 50 and of the cathode follower formed by the tetrode 41 in the channel 18 are similar to those of the corresponding circuitry provided at the input to the channel 17 except for the fact that the network 50 is tuned to a frequency $f''$. Likewise, the remaining corresponding components employed in the channels 17 and 18 perform similar functions. Therefore, during the remaining portion of the description, the components of the channel 18 that correspond to those of the channel 17 will be designated by like but primed numerals.

Inasmuch as signal components having frequencies other than the selected frequencies $f'$ and $f''$ are not passed by either the channel 17 or 18, the function of the gated amplifier 13 is in no way affected by the circuit 10 when these other signal components are fed from the stage 11. However, as hereinafter described, when a signal component having a frequency $f'$ or $f''$ is fed from the input stage 11, the channels 17 and 18 function in response to the appropriate frequency to supply an output signal that interrupts the output from the gated amplifier.

In this connection, the output of the cathode follower formed by the tetrode 39 is fed to an audio amplifier circuit 60 while the output from the cathode follower including the tetrode 41 is fed to an audio amplifier circuit 60′. More particularly, a coupling capacitor 61 is connected between the cathode of the tetrode 39 and the grid of a vacuum tube triode 62 that is employed in the amplifier circuit 60. In the conventional manner, a grid load resistor 63 is connected between ground and the grid of the triode 62, and the plate of this tube is connected to the positive potential source 29 through a plate load resistor 66′. In the channel 18, the cathode of the tube 41 is connected to the grid of a triode 62′ through a coupling capacitor 61′. Similarly, a grid load resistor 63′ and plate load resistor 64′ are connected in circuit with the triode 62′ so that an effective audio amplifier 60′ is also provided in this channel.

Considering the cooperative functioning of the cathode follower and audio amplifier circuits employed in the channel 17, it will be appreciated that a signal component having a frequency f′ results in a voltage being developed across the network 44 that is applied to the grid of the tetrode 39 and alters the conductive state thereof. As a result, an output voltage is developed across the resistors 51 and 52 in the cathode circuit of the tetrode 39, and this output voltage is in phase with that supplied to the grid of the tube. The voltage developed at the cathode of the tube 39 is fed through the coupling capacitor 61 and applied to the grid of the triode 62. In a conventional manner, the conductive state of the triode 62 is responsively varied so that an amplified output voltage is developed at the plate thereof, which voltage is 180° out of phase with that applied to the grid.

As shown in FIGURE 2, the output from the audio amplifier 60 is fed to a half wave rectifier network 71 through a coupling capacitor 72. The half wave rectifier 71, which preferably includes a semiconductor diode 73 and a diode load resistor 74, functions to rectify the output voltage from the amplifier 60. Accordingly, during the period when a signal component having a frequency f′ renders the channel 17 effective as described above, a pulsating direct current voltage of positive polarity is fed from the output of this channel and to the gated amplifier 13 through a relatively large isolation resistor 75. The output from the channel 17 is preferably supplied to the gated amplifier 13 so that the positive voltage pulses developed across the rectifier circuit 71 result in the gated amplifier being transiently rendered ineffective.

The operation of the channel 18 in response to a signal component having a frequency signal f″ corresponds to that of the channel 17, and the output circuit thereof similarly includes a half wave rectifier network 71′. In this connection, the half wave rectifier network 71′ performs the same function as does the network 71 and, when the channel 18 is rendered effective, supplies positive voltage pulses through an isolation resistor 75′ and to the gated amplifier 13 by way of the conductor 22. As shown, a conductor 82 connects the output of the rectifier network 71′ to the conductor 22, and a filter capacitor 83 is connected between this conductor and ground. By employing the isolating resistors 75 and 75′ at the output of each of the rectifier networks, the conductive state of the diode in one of the rectifier networks (e.g. that of the channel 17) is unaffected by output voltage pulses produced due to the rectifying action of the other of the networks (e.g. that of the channel 18).

From the foregoing description of the circuit 10 as used in a typical application, it will be appreciated that the output from both of the channels 17 and 18 transiently renders the gated amplifier 13 inoperative. However, and as previously described, it is generally preferable to utilize the circuit 10 so that the operation of one or more responsive networks 15 is concomitantly controlled by the output from either the channel 17 or the channel 18. Accordingly, the half wave rectifier network 71 at the output of the channel 17 and an additional rectifier network 91 at the output of the channel 18 are employed in the circuit 10 to produce output signals of opposite polarity that are fed to and control the responsive network 15.

In this connection, the output from the aforedescribed rectifier network 71 is fed through an isolation resistor 92 and is applied to the conductor 23 that is connected to the input of responsive network 15 (FIG. 1). Similarly the output from the rectifier network 91, which corresponds essentially to the rectifier networks 71 and 71′, is fed to the conductor 23 through an isolation resistor 92′. More particularly, the network 91 includes a parallelly connected diode 93 and load resistor 94 that are connected to ground and to the plate of the triode 62′ through a coupling capacitor 96. With this circuit arrangement, voltage pulses of negative polarity are developed across the output of the rectifier 91 during each negative half cycle of the output signal derived from the amplifier 60′.

Considering the overall operation of the circuit 10 in its previously assumed application as a selective muting network, it will be appreciated that the entire spectrum of the audio information derived from the receiver stage 11 is monitored by the circuit 10. Assuming further that the circuit 10 is to be utilized to block the output from the gated amplifier for a relatively long period (i.e. corresponding to the duration of a commercial message between periods of continuous music presentation), an audio signal component of preselected duration and/or amplitude and having a frequency f′ will be transmitted with and as a part of the audio information so as to signal the beginning of the period when the output of the gated amplifier is to be blocked.

Although the other signal components of the audio information derived from the stage 11 are not passed by either the channels 17 or 18, the signal component having the frequency f′ will result in the channel 17 being rendered effective, as previously described. As a result, an amplified output signal, also having a frequency f′, is derived from the amplifier 60 and the voltage pulses of positive polarity are developed across the rectifier network 71. The positive voltage pulses, which are developed at the output of the channel 17 as long as a signal component having a frequency f′ is sensed by the circuit 10, are fed to the gated amplifier 13 to transiently block the output therefrom. At the same time, these positive voltage pulses are fed through the conductor 23 to the responsive network 15. Preferably, the responsive network includes a suitable relay circuit that is rendered effective in response to the output of the channel 17 and thereby opens the circuit between the gated amplifier 13 and the speaker 14. Since the gated amplifier 13 is cut off by the signal component having the frequency f′, this signal component is not supplied to the speaker nor is any further output derived from the gated amplifier and fed to the speaker until such time as the conductive state of the responsive network 15 is returned to a normal condition.

In this connection, when it is desired to reestablish the connection between the gated amplifier 13 and the speaker 14, a signal component having a frequency f″ is transmitted with and as a part of the audio information that is developed at the output of the stage 11 and sensed by the circuit 10. The circuit 10 and more particularly the channel 18 responds to the signal component having the frequency f″ by producing positive voltage pulses at the output of the rectifier network 71′ and voltage pulses of negative polarity at the output of the rectifier network siently interrupts the operation of the gated amplifier, while that derived from the rectifier network 91 is supplied to the responsive network 15 to actuate this circuit so that the connection between the gated amplifier and speaker is reestablished. Again, since the signalling pulse which triggers the desired operation of the responsive network 15 also causes the gated amplifier to be transiently rendered ineffective, this signalling pulse is not transmitted to the speaker 14.

It should be understood that the responsive network 15, which may be any of a variety of relay control circuits or the like is preferably selected so that it will only respond to signalling pulses of preselected magnitude and/or duration. Accordingly, although the audio output from the stage 11 may include components having a frequency f′ and/or f″, the responsive network will not be triggered by these components. Similarly, the biasing circuitry for the gated amplifier can be selected so that such randomly occurring components having frequencies corresponding to that to which the channels 17 and 18 are tuned do not cause the output from the gated amplifier to be interrupted. However, in practice, this latter expedient is generally unnecessary since the transient interruption of the output of the gated amplifier when such random components are detected by either the channel 17 or 18 does not materially distort the output derived from the receiver.

A further distinct advantage of the circuit 10 stems from the use of dual rectifier circuits at the output of one of the channels (i.e. the circuits 71' and 91 in the illustrated embodiment). That is, if a signal passing through one of the channels overlaps and also causes the other channel to respond due to some unforeseen circuit malfunction, the responsive network will be precluded from being inadvertently triggered into an undesired conductive or non-conductive state and the normal response thereof insured. More particularly, since the output from each of the channels that is supplied to the network 15 is of opposite polarity, the output voltages compensate for any channel overlap.

Because of the highly selective response of the circuit 10, it can respond to a substantial number of control signals, and those portions of the spectrum having frequencies above, below and between these control signals can nevertheless be reproduced with good fidelity. Additionally, this characteristic of high selectivity can be relied upon so that the circuit 10 might be employed in receivers to effect nothing more than the elimination of objectionable tones or pulses that form a part of a frequency spectrum pursuant to a selected transmission mode. This use of the circuit 10 (e.g. in a pay-TV system) would assure that only those receivers adapted with the circuit could utilize the unobjectionable portion of the frequency spectrum.

It should be understood that the foregoing description of the circuit 10 in one typical application is merely illustrative of the invention. In this connection, the circuit can be employed in a variety of applications as previously described. Moreover, rather than employing two frequency responsive channels 17 and 18, it may be desired to employ only one sensing channel (i.e. to control the operation of a stepping or alternating relay) or a number of additional sensing channels in a particular application. Whether employing one or several such channels, any number of independent responsive networks similar to the network 15 could be arranged to be responsive to the output thereof. These and other modifications of the circuit 10 to meet the particular requirements of a specific receiver and/or which are necessary to adapt the circuit for use in a given situation clearly fall within the scope of the invention, various features of which are set forth in the accompanying claims.

What is claimed is:

1. A circuit for simultaneously controlling the operation of an external responsive network and the operation of a receiver network that includes an output stage whereat reproduced information is available for monitoring and an output circuit connected to the output stage for supplying the reproduced information to a transducer or the like, which circuit comprises an amplifier connected to the output stage of the receiver network for monitoring the reproduced information, first and second selectively responsive channels connected in circuit with said amplifier, each of said responsive channels being tuned to a different preselected frequency within the frequency spectrum of reproduced information and being responsive to the components of the reproduced information having a frequency corresponding to that to which each is tuned for producing an output signal corresponding thereto, said first of said selectively responsive channels including rectifier means in the output circuit thereof, said rectifier means of said first channel producing a control voltage of preselected polarity in response to an output signal from said channel, said second selectively responsive channel including dual rectifier means in the output circuit thereof, said dual rectifier means producing two distinct control voltages of preselected polarity, and means connecting said rectifier means of said first and second responsive channels in circuit with the output circuit of the receiving network and the external responsive network.

2. A circuit in accordance with claim 1 and wherein the control voltage produced by said rectifier means in the output of said first responsive channel is supplied to both the output circuit of the receiving network and the external responsive network, wherein one of the control voltages produced by the dual rectifier means is supplied to the output circuit of the receiving network and has a polarity corresponding to the polarity of the control voltage produced by the rectifier means of said first responsive channel and wherein the second control voltage produced by said dual rectifier means is supplied to said external responsive network and has a polarity opposite to the polarity of the control voltage produced by the rectifier means of said first responsive channel.

3. A circuit for simultaneously controlling the operation of an external responsive network and the operation of a receiver network that includes an output stage whereat reproduced information is available for monitoring and an output circuit connected to the output stage for supplying the reproduced information to a transducer or the like, which circuit comprises an amplifier connected to the output stage for monitoring the reproduced information, a first selectively responsive channel connected to the output of said amplifier, said first responsive channel including a highly selective input circuit that is tuned to a first preselected frequency within the frequency spectrum of the reproduced information and including an amplifier circuit that produces an output signal when said tuned input circuit responds to signal components derived from said amplifier, rectifier means connected to said amplifier circuit of said first channel for producing a control voltage of preselected polarity when an output signal is produced by said amplifier circuit, said rectifier means being connected in circuit with the output circuit of the receiver network and with said external responsive network so that the conductive state of said external responsive network is altered and maintained in an altered conductive state in response to the production of a control voltage by said rectifier means, a second selectively responsive channel connected to the output of said amplifier, said second responsive channel including a highly selective input circuit that is tuned to a second preselected frequency within the frequency spectrum of the reproduced information and including an amplifier circuit that reproduces an output signal when said input circuit responds to signal components derived from said amplifier, and dual rectifier means connected to said amplifier circuit of said second channel for producing control voltages of opposite polarity when an output signal is produced by said amplifier circuit, one of said dual rectifier means being connected in circuit with the output circuit of the receiver network, the other of said dual rectifier means being connected in circuit with said external responsive network and producing a control voltage having a polarity opposite to that produced by the rectifier means of said first responsive channel for returning said external responsive network to a normal conductive state.

4. A circuit in accordance with claim 3 and wherein the control voltages supplied to said external responsive network are cancelled out when output signals are inadvertently simultaneously produced by said channels in response to the same signal component being derived from said amplifier.

References Cited

UNITED STATES PATENTS

| | | | |
|---|---|---|---|
| 2,602,885 | 7/1952 | Armstrong | 325—348 |
| 2,671,166 | 3/1954 | O'Brien | 325—389 X |
| 3,188,571 | 6/1965 | Micheal | 325—402 |
| 3,241,073 | 3/1966 | Hummel | 325—313 X |

KATHLEEN H. CLAFFY, *Primary Examiner.*

R. P. TAYLOR, *Assistant Examiner.*

UNITED STATES PATENT OFFICE

CERTIFICATE OF CORRECTION

Patent No. 3,332,021 July 18, 1967

Leonard Emfred Hedlund

It is hereby certified that error appears in the above numbered patent requiring correction and that the said Letters Patent should read as corrected below.

Column 1, line 31, for "in" read -- or --; column 4, line 70, for "66′" read -- 66 --; column 6, line 52, after "network" insert -- 91. The output from the rectifier network 71′ again tran- --; column 8, line 46, for "reproduces" read -- produces --.

Signed and sealed this 18th day of June 1968.

(SEAL)
Attest:

Edward M. Fletcher, Jr.
Attesting Officer

EDWARD J. BRENNER
Commissioner of Patents